(12) United States Patent
Sasaki et al.

(10) Patent No.: US 7,417,229 B2
(45) Date of Patent: Aug. 26, 2008

(54) THERMAL-TYPE INFRARED DETECTION ELEMENT

(75) Inventors: Tokuhito Sasaki, Tokyo (JP); Masahiko Sano, Tokyo (JP)

(73) Assignee: NEC Corporatioin, Tokyo (JP)

( * ) Notice: Subject to any disclaimer, the term of this patent is extended or adjusted under 35 U.S.C. 154(b) by 159 days.

(21) Appl. No.: 11/356,380

(22) Filed: Feb. 17, 2006

(65) Prior Publication Data

US 2006/0186339 A1 Aug. 24, 2006

(30) Foreign Application Priority Data

Feb. 18, 2005 (JP) .............................. 2005-042221

(51) Int. Cl.
*G01J 5/00* (2006.01)
(52) U.S. Cl. .................................. 250/338.1
(58) Field of Classification Search ............... 250/338.1
See application file for complete search history.

(56) References Cited

U.S. PATENT DOCUMENTS 4,673,629 A * 6/1987 Yamazaki et al. .......... 430/57.4
5,021,663 A * 6/1991 Hornbeck .................. 250/349

FOREIGN PATENT DOCUMENTS

| JP | 2001-99705 | 4/2001 |
| JP | 2001-255203 | 9/2001 |
| JP | 2002-071452 | 3/2002 |
| JP | 2003-106895 | 4/2003 |

OTHER PUBLICATIONS

Japanese Office Action dated Nov. 28, 2007, with partial English translation.
Journal of the Electrochemical Society, "Physical and Barrier Properties of PECVD Amorphous Silicon-Oxycarbide from Trimethylsilane anc $CO_2$," vol. 151, No. 10 (2004) G704-G708.
Japanese Office Action date May 13, 2008, with partial English translation.
Proceedings of the 67th Symposium on Semiconductors and Integrated Circuits Technology, Electronic Materials Committee, Electrochemical Society of Japan, "Characterization of Ashing Damage in porous Low-k Dielectric Films "Dec. 9, 2004, pp. 30-33.

* cited by examiner

*Primary Examiner*—David P. Porta
*Assistant Examiner*—Mindy Vu
(74) *Attorney, Agent, or Firm*—McGinn IP Law Group, PLLC

(57) ABSTRACT

An infrared absorption film (first through third infrared absorption films) that constitutes a photoreceptor of a thermal-type infrared detection element comprises a laminate film in which a film composed of a novel SiCO material having high absorption on the short-wavelength end (approximately 8 to 10 μm) of the waveband (atmospheric window) from 8 to 14 μm is combined with a film composed of SiO, SiN, SiC, SiON, SiCN, or another material having high absorption on the long-wavelength end (approximately 10 to 14 μm) of the abovementioned waveband. Infrared rays on the short-wavelength end that could not be effectively utilized by the conventional thermal infrared detection element can thereby be absorbed by the SiCO membrane, infrared rays throughout the abovementioned waveband can be effectively utilized, and the sensitivity of the thermal infrared detection element can be enhanced.

9 Claims, 8 Drawing Sheets

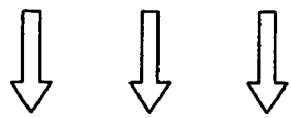
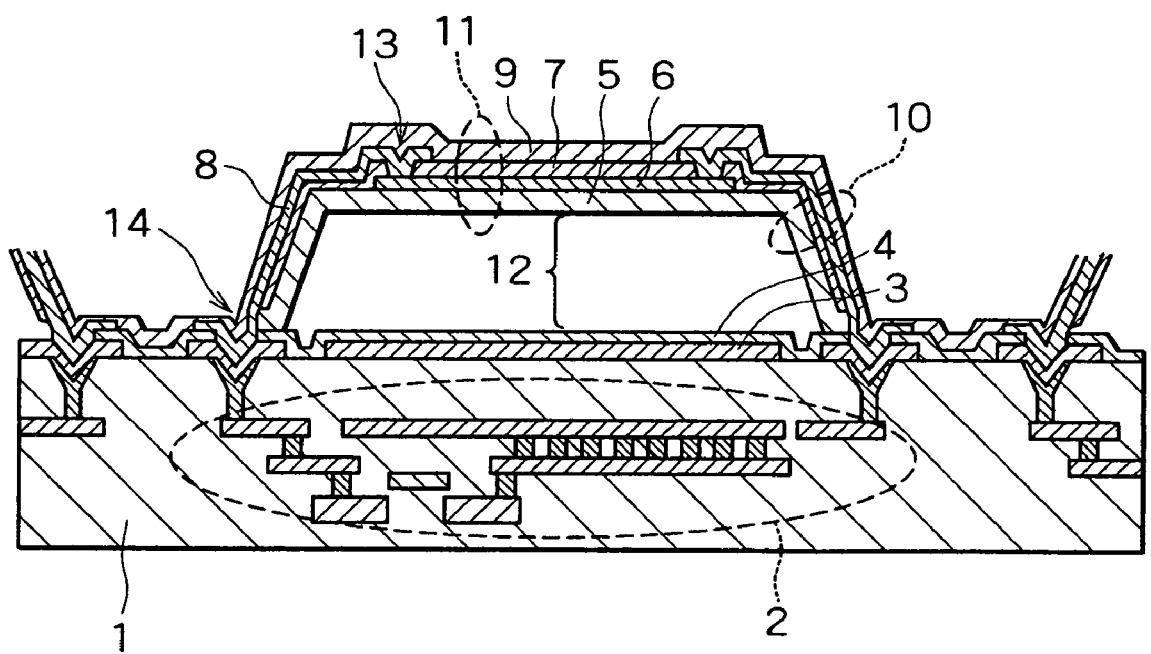

THERMAL-TYPE INFRARED DETECTION ELEMENT

BACKGROUND OF THE INVENTION

1. Field of the Invention

The present invention relates to a thermal-type infrared detection element having an improved infrared absorption film that constitutes a photoreceptor.

2. Description of the Related Art

A thermal-type infrared detection element measures the temperature of an object from the change in resistance that occurs in a heat-sensitive resistor. This usually occurs when infrared rays emitted by a body are absorbed and converted to heat in an infrared absorption film, the temperature of a bolometer thin film or other heat-sensitive resistor that forms a diaphragm having a microbridge structure is increased, and the resistance of the resistor is changed.

More specifically, this type of thermal-type infrared detection element is composed of a photoreceptor and a beam for holding the photoreceptor in a suspended state above a circuit board. The photoreceptor is provided with a bolometer layer and an infrared absorption film for absorbing incident infrared rays and protecting the bolometer layer. The beam is provided with wiring for connecting the bolometer layer with a reading circuit formed in advance on the circuit board. When incident infrared rays are absorbed by the infrared absorption film, and the temperature of the photoreceptor is increased, the resistance of the bolometer layer changes, and this change in resistance is detected by the reading circuit and outputted as a temperature. A thermal-type infrared detection element having this type of structure is disclosed in JP-A 2002-71452 (pp. 5-8, FIG. 6), for example.

Increasing the change in resistance of the bolometer layer with respect to the change in temperature of the photoreceptor is of primary importance in increasing the sensitivity (S/N ratio) of the thermal-type infrared detection element described above. Therefore, a material having a large temperature coefficient of resistance (TCR: Temperature Coefficient Resistance) is used for the bolometer layer. Increasing the efficiency with which incident infrared rays are absorbed is the second most important factor. In order to achieve this object, an infrared reflection film is provided in a position facing the photoreceptor on the circuit board, and the gap between the photoreceptor and the infrared reflection film is set so that an optical resonance structure is formed. In order to also increase the absorption efficiency with respect to incident infrared rays, the infrared absorption film that constitutes a photoreceptor is endowed with a laminate structure made up of films composed of different materials.

Since the thermal-type infrared detection element thus configured detects infrared rays having wavelengths from 8 to 14 μm in the so-called atmospheric window, the infrared absorption film must be composed of a material that absorbs infrared rays having the abovementioned wavelengths. From a manufacturing standpoint, the infrared absorption film must also be composed of a material that is easily formed into a film, etched, or otherwise processed. Therefore, silicon oxide (SiO), silicon nitride (SiN), silicon carbide (SiC), silicon oxynitride (SiON), silicon carbonitride (SiCN), and the like have conventionally been used as materials that satisfy these conditions.

However, although these materials absorb infrared rays in the abovementioned waveband, since the absorption rate is high on the long-wavelength end (approximately 10 to 13 μm) of the abovementioned waveband, and is low on the short-wavelength end thereof (approximately 8 to 10 μm), infrared rays on the short-wavelength end of the abovementioned waveband are not effectively utilized.

More specifically, as shown in FIG. 1, SiC has maximum absorption of wavelengths near 13 μm; SiN, SiCN, and SiON have maximum absorption of wavelengths near 12 μm; and absorption is high for infrared rays on the long-wavelength end of the abovementioned waveband. However, absorption sharply declines on the short-wavelength end, and the absorption in the waveband of 8 to 12 μm for SiON and SiN is only about 20%. Since the absorption rate of SiO is at maximum near 10 μm, but is generally low compared to that of SiN, SiON, and SiC, infrared rays having wavelengths in the abovementioned range cannot be efficiently absorbed. Infrared rays on the short-wavelength end of the abovementioned waveband therefore cannot be effectively utilized even when infrared absorption films composed of these materials are combined in a laminate. This results in drawbacks whereby the sensitivity of the thermal-type infrared detection element cannot be adequately increased.

A method for increasing the thickness of the infrared absorption film is also considered as a way of increasing the absorption efficiency of infrared rays, but the heat capacity of the photoreceptor increases when the thickness of the infrared absorption film is increased, and the temperature change-with respect to the incident infrared rays decreases. Since an infrared absorption film is also formed in the beam, the beam increases in diameter, and the amount of heat discharged towards the circuit board increases. Therefore, the sensitivity of the thermal-type infrared detection element cannot be increased by this method.

SUMMARY OF THE INVENTION

An object of the present invention is to improve the structure of an infrared absorption film that constitutes a photoreceptor, and to provide a thermal-type infrared detection element whereby incident infrared rays are efficiently absorbed and sensitivity is enhanced.

The thermal-type infrared detection element according to the first aspect of the present invention has a structure for absorbing infrared rays in a waveband of approximately 8 to 14 μm, wherein the structure is composed of a plurality of types of films, and a film composed of SiCO is included in the plurality of types of films.

The thermal-type infrared detection element according to the second aspect of the present invention is a thermal-type infrared detection element in which a photoreceptor provided with a heat-sensitive resistor and an infrared absorption film is held in midair by a beam having one end thereof fixed to a substrate, wherein the infrared absorption film is composed of a plurality of types of films, and a film composed of SiCO is included in the plurality of types of films.

The thermal-type infrared detection element according to the third aspect of the present invention is a thermal-type infrared detection element in which a photoreceptor provided with a heat-sensitive resistor and an infrared absorption film is held in midair by a beam having one end thereof fixed to a substrate, wherein the infrared absorption film is composed of a plurality of types of films, and the plurality of types of films comprise a film composed of SiCO material, and a film composed of any of the materials selected from the group consisting of SiO, SiN, SiC, SiON, and SiCN.

The thermal-type infrared detection element according to the fourth aspect of the present invention is a thermal-type infrared detection element comprising a photoreceptor provided with a heat-sensitive resistor and an infrared absorption film, and a beam that includes wiring whose one end is connected to the heat-sensitive resistor and whose other end is connected to a circuit formed in a substrate, wherein the photoreceptor is held in midair by the beam; wherein the infrared absorption film comprises a plurality of types of films that include a first infrared absorption film formed in the bottom layer of the heat-sensitive resistor, a second infrared absorption film formed in the top layer of the heat-sensitive resistor, and a third infrared absorption film formed in the top layer of the wiring connected to the heat-sensitive resistor via a through-hole provided to the second infrared absorption film; and the plurality of types of films comprise a film composed of SiCO material, and a film composed of any of the materials selected from the group consisting of SiO, SiN, SiC, SiON, and SiCN.

The present invention may be configured so that the film composed of SiCO material is formed in a layer other than the outermost layer.

The present invention may also be configured so that some films among the plurality of types of films are formed only in the photoreceptor, and other films are formed continuously with both the photoreceptor and the beam.

It is preferred in the present invention that the film composed of SiCO has maximum absorption with respect to infrared rays in the waveband of approximately 9 to 10 μm.

Thus, in the present invention, the infrared absorption film and other infrared-absorbing structures that constitute a photoreceptor of the thermal-type infrared detection element have a laminate structure in which a film composed of SiCO material having high absorption on the short-wavelength end of the 8 to 14-μm waveband is combined with a film composed of SiO, SiN, SiC, SiON, SiCN, or another material having high absorption on the long-wavelength end of the abovementioned waveband. Therefore, infrared rays on the short-wavelength end, which cannot be effectively utilized by the conventional thermal-type infrared detection element, can be efficiently absorbed, thereby enhancing the sensitivity of the thermal-type infrared detection element.

By the thermal-type infrared detection element of the present invention thus configured, infrared rays that are incident through the atmospheric window in the 8 to 14-μm waveband can be efficiently absorbed. The sensitivity of the thermal-type infrared detection element can thereby be enhanced.

The reason for this is that the infrared absorption film that constitutes a photoreceptor of the thermal-type infrared detection element is a laminate film in which a film composed of the SiCO material newly discovered by the present applicant, having high absorption on the short-wavelength end (approximately 8 to 10 μm) of the abovementioned waveband, is combined with a film composed of SiO, SiN, SiC, SiON, SiCN, or another material having a high absorption rate on the long-wavelength end (approximately 10 to 14 μm) of the abovementioned waveband. Therefore, infrared rays on the short-wavelength end, which cannot be effectively utilized by the conventional thermal-type infrared detection element, can be absorbed by the SiCO film.

BRIEF DESCRIPTION OF THE DRAWINGS

FIG. 2 is a sectional view in which the structure of one pixel of the thermal-type infrared detection element according to an embodiment of the present invention is schematically depicted in alignment with the current path;

DESCRIPTION OF THE PREFERRED EMBODIMENTS

As described in relation to the prior art, it is important that an infrared absorption film that constitutes a photoreceptor be formed from a material having good infrared absorption characteristics in order to enhance the sensitivity with which a thermal-type infrared detection element detects infrared rays that are incident through the atmospheric window of the 8 to 14 μm waveband. However, the SiO, SiN, SiC, SiON, SiCN, and other materials in conventional use all have the drawbacks of low absorption of infrared rays near 8 to 10 μm, and inability to effectively utilize incident infrared rays.

As a result of forming an infrared absorption film using various starting materials and measuring the infrared absorption characteristics of the infrared absorption film thus formed in order to overcome the abovementioned drawbacks, the inventors discovered that SiCO obtained by bonding silicon, carbon, and oxygen to each other in a ratio of 1:1:1 is easily formed into a film or etched, has good process compatibility, has adequate capability as a protective film, has maximum absorption on the short-wavelength end (near 9 to 10 μm) of the abovementioned waveband, and has a peak absorption rate that is extremely high (50% or higher) compared to other materials.

By thus endowing the infrared absorption film that constitutes a photoreceptor of a thermal-type infrared detection element with a laminate structure in which a film composed of the newly discovered SiCO material is combined with a film composed of a publicly known SiO, SiN, SiC, SiON, SiCN, or other materials, the inventors succeeded in increasing the absorption of infrared rays in a wide range of wavelengths, from the short-wavelength end of the abovementioned waveband to the long-wavelength end thereof. The change in temperature of the photoreceptor was thereby increased, and the sensitivity of the thermal-type infrared detection element was enhanced.

Since the absorption rate at longer wavelengths decreases when the film composed of this SiCO material is used alone, the film composed of the novel SiCO material in the present invention is used in combination with a conventional film having a high absorption rate at longer wavelengths. However, the SiCO film may be used for any film within the laminate-structured infrared absorption film, and any type of film may be selected as the other film combined with the SiCO film. A thermal-type infrared detection element that uses this SiCO film as the infrared absorption film will be described hereinafter with reference to the drawings.

Figure 1:
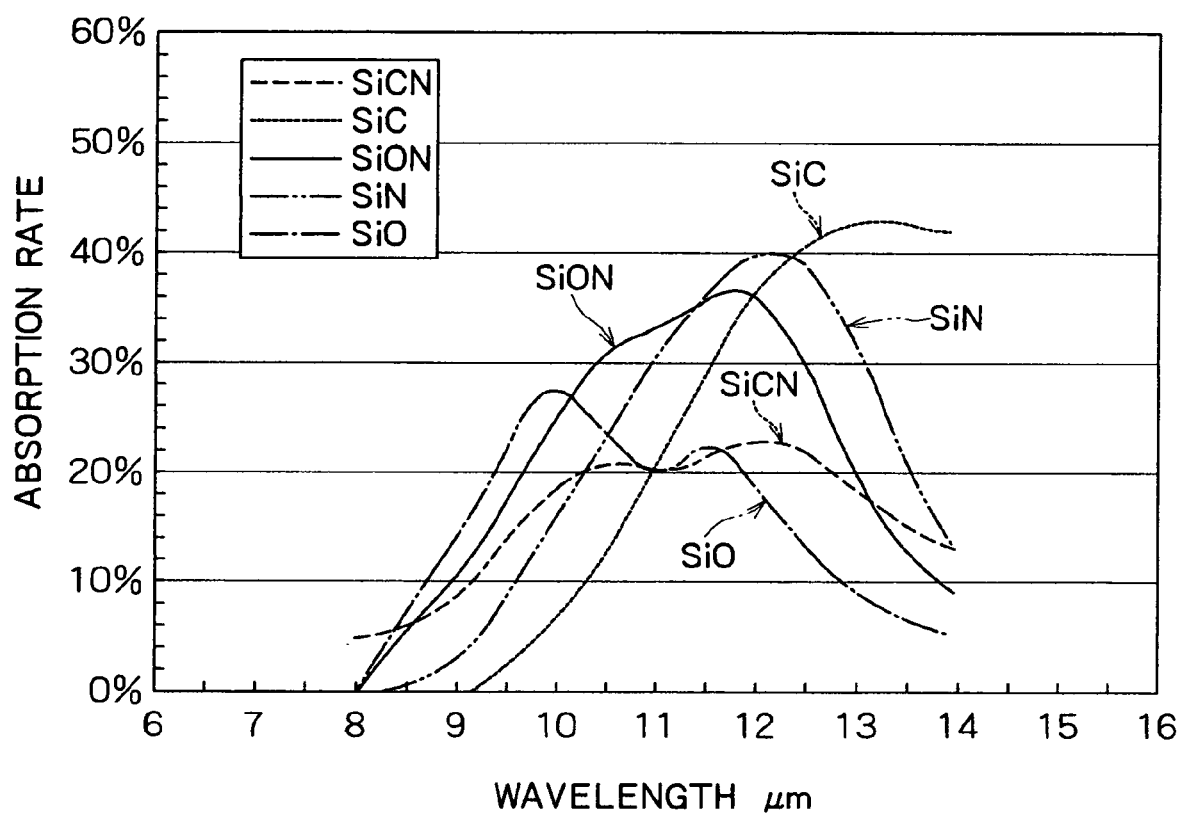
FIG. 1 is a diagram showing the infrared absorption characteristics of various types of conventional materials.
Figure 3:
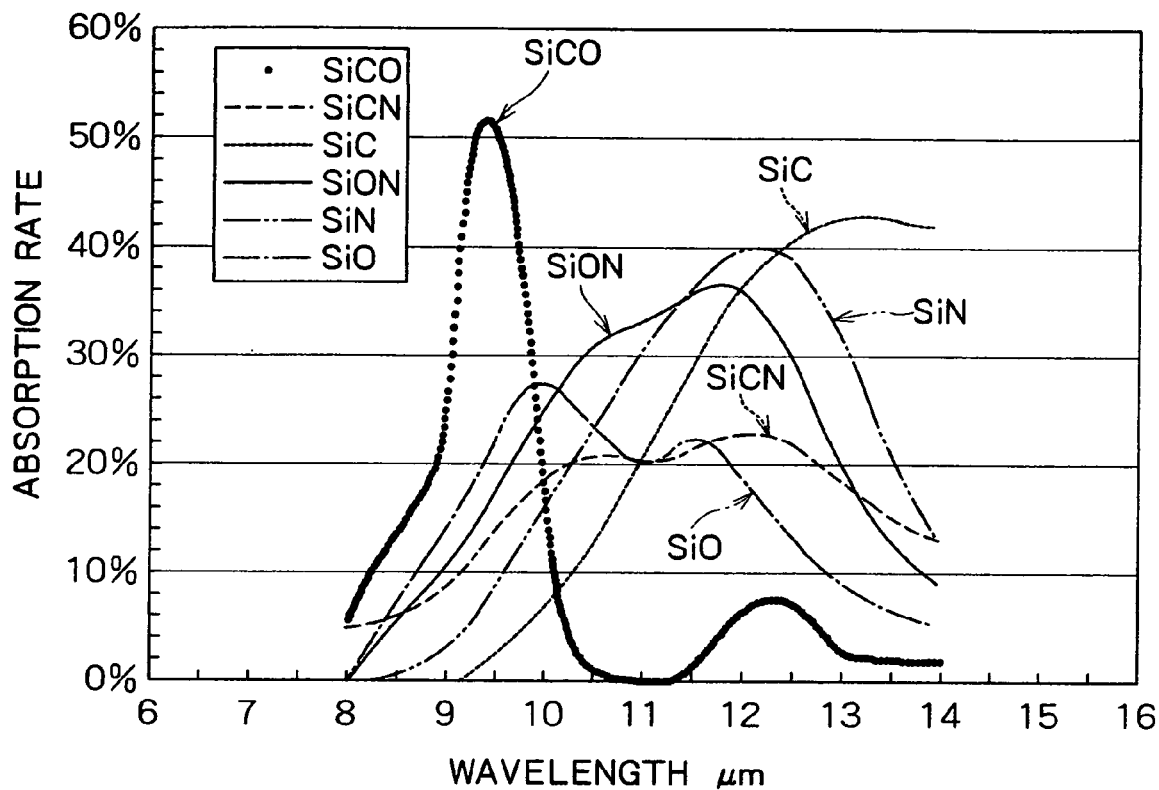
FIG. 3 is a diagram showing the infrared absorption characteristics of various types of materials including SiCO.
Figure 4:
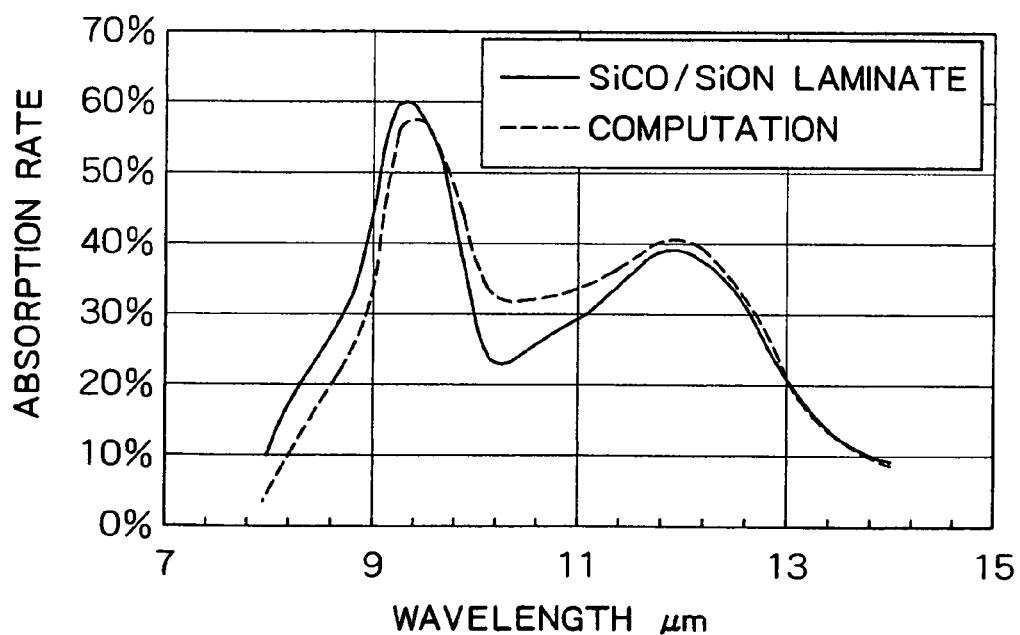
FIG. 4 is a diagram showing the infrared absorption characteristics of an SiCO/SiON laminate film.
Figure 5:
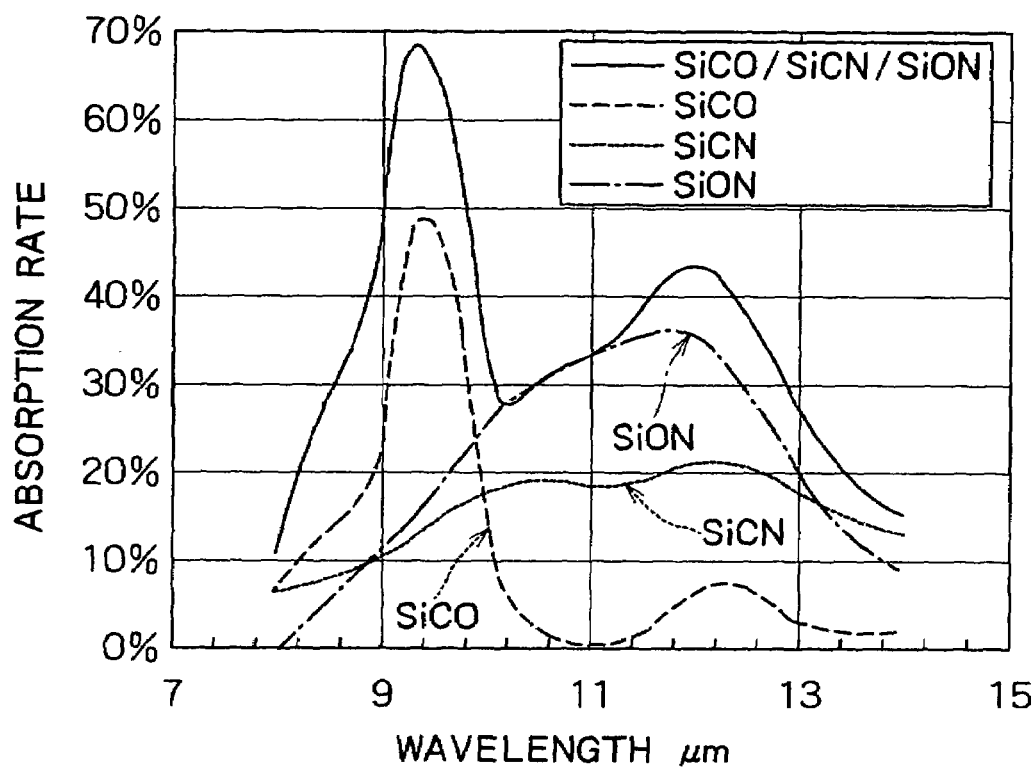
FIG. 5 is a diagram showing the infrared absorption characteristics of SiCO, SiCN, SiON, and an SiCO/SiCN/SiON laminate film.
Figure 13:
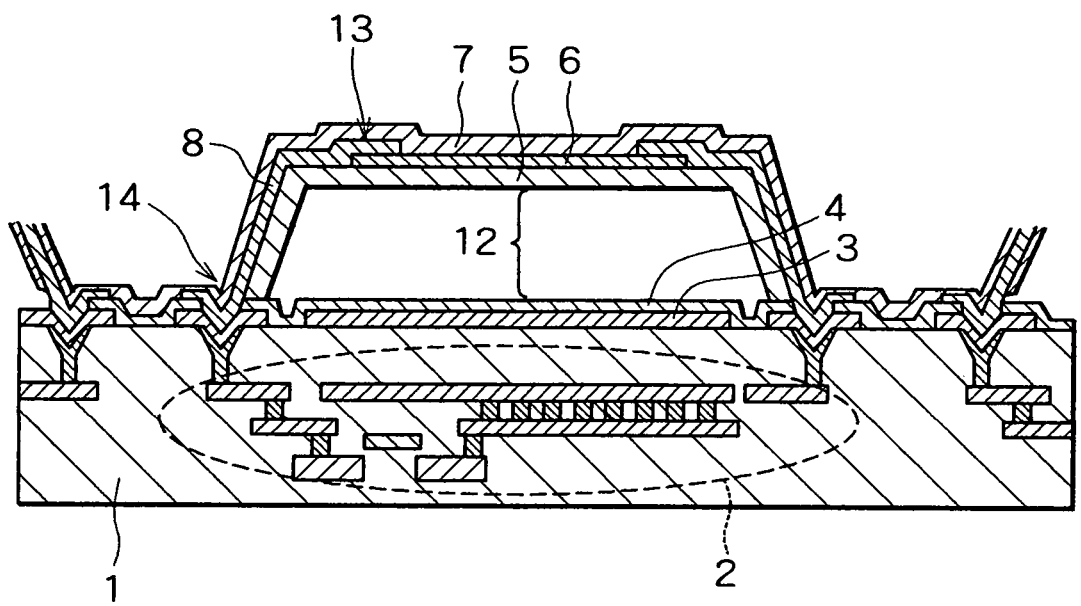
FIG. 13 is a sectional view in which the structure of the thermal-type infrared detection element according to another embodiment of the present invention is depicted in alignment with the current path.
Figure 14:
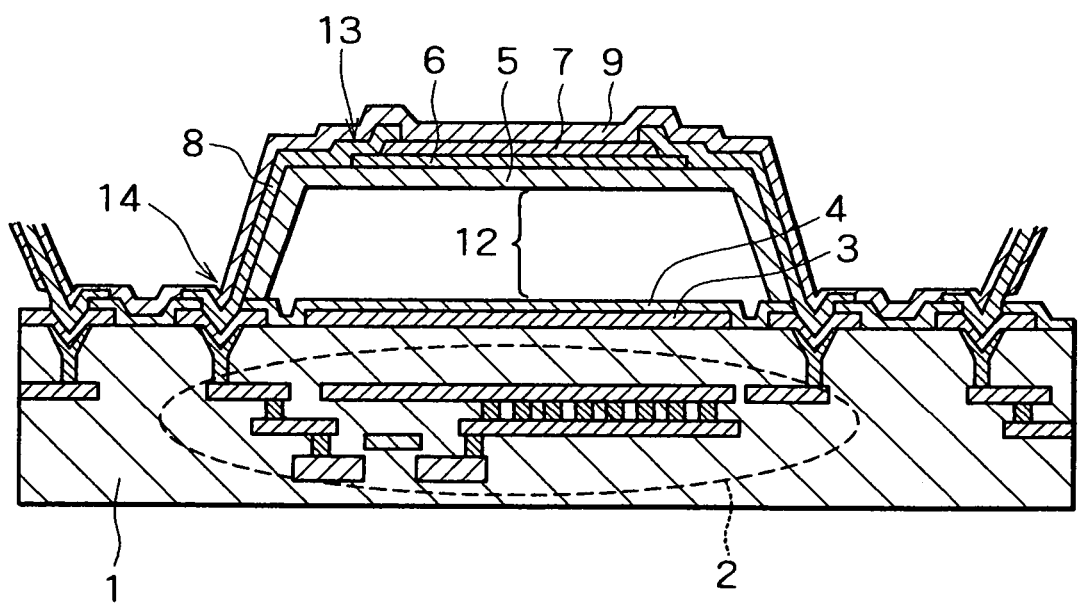
FIG. 14 is a sectional view in which the structure of the thermal-type infrared detection element according to yet another embodiment of the present invention is depicted in alignment with the current path.

A thermal-type infrared detection element according to an embodiment of the present invention will be described with reference to FIGS. 2 through 14 in order to give a more detailed description of the embodiment of the present invention described above. FIG. 2 is a sectional view in which one pixel of the thermal-type infrared detection element according to the present embodiment is depicted in alignment with the current path, and FIG. 3 is a diagram showing the infrared absorption characteristics of various types of materials that include SiCO. FIG. 4 is a diagram showing the infrared absorption characteristics of an SiCO/SiON laminate film, and FIG. 5 is a diagram showing the infrared absorption characteristics when SiCO, SiCN, and SiON are used in single-layer films, and when these materials are used in a laminate film. FIGS. 6 through 12 are sectional views showing the sequence of steps in the manufacturing method for the thermal-type infrared detection element according to the present embodiment, and FIGS. 13 and 14 are sectional views showing another structure of the thermal-type infrared detection element according to the present embodiment.

In the thermal-type infrared detection element of the present embodiment as shown in FIG. 2, an infrared reflection film 3 composed of Al, Ti, W, or a silicide of any of these elements in the form of a film or the like is formed on a circuit board 1 in which a reading circuit 2 is incorporated into a silicon wafer or other semiconductor wafer by a CMOS process; and a protective film 4 composed of a silicon oxide film, a silicon nitride film, a silicon oxynitride film, or the like is formed on the top layer thereof. A hollow portion 12 is filled with a patterned photosensitive polyimide in an intermediate stage of the device manufacturing, and is removed by oxygen plasma ashing or the like in the final step of device manufacturing. The layer formed by filling in this hollow portion 12 is generally referred to as the sacrifice layer. A photoreceptor 11 is formed on this sacrifice layer, and a beam 10 connected to the end portion of the photoreceptor 11 is formed on the side surface of the sacrifice layer.

The photoreceptor 11 is composed, for example, of a bolometer layer 6 composed of vanadium oxide or the like, and an infrared absorption film (in this case, a first infrared absorption film 5, a second infrared absorption film 7, and a third infrared absorption film 9) having a laminate structure for absorbing infrared rays in the waveband from 8 to 14 µm and protecting the bolometer layer 6. The beam 10 is composed of wiring 8 composed of Ti or the like, and a protective film (in this case, a first infrared absorption film 5, a second infrared absorption film 7, and a third infrared absorption film 9, in the same manner as in the case of the photoreceptor 11) for protecting this wiring 8, and separates the photoreceptor 11 from the substrate via the hollow portion 12 and holds [the photoreceptor] in midair over the circuit board 1, thereby creating a thermal separation structure.

Infrared rays that are incident through the atmospheric window waveband of 8 to 14 µm are absorbed by the first infrared absorption film 5, the second infrared absorption film 7, and the third infrared absorption film 9 and cause the temperature of the photoreceptor 11 to increase. The resistance of the bolometer layer 6 changes in conjunction with the temperature increase of the photoreceptor 11, and this change in resistance of the bolometer layer 6 is detected by the reading circuit 2 connected via an electrode unit 13, the wiring 8, and a contact unit 14.

It is sufficient as long as the bolometer material is a material having a high temperature coefficient of resistance (TCR), and any of the following may be used besides vanadium oxide: a NiMoCo oxide, a Ti metal thin film, a polycrystalline silicon thin film, a non-crystalline silicon thin film, a non-crystalline germanium thin film, a non-crystalline silicon germanium thin film, a $(La, Sr)MnO_3$ thin film, a YBaCuO thin film, or the like may be used. It is also sufficient as long as the material used for the wiring 8 has low thermal conductivity, and besides Ti, a Ti alloy or NiCr may be used. A component in which boron or arsenic is implanted/diffused at high concentration in silicon may also be used instead of the wiring 8 when polycrystalline silicon or non-crystalline silicon is used in the bolometer material.

In the past, SiO, SiN, SiC, SiON, SiCN and the like were used as the material for the first infrared absorption film 5, second infrared absorption film 7, and third infrared absorption film 9. However, as shown in FIG. 3, since these materials have high absorption on the long-wavelength end and low absorption on the short-wavelength end of the atmospheric window waveband of 8 to 14 µm, drawbacks occur whereby it is impossible to efficiently absorb infrared rays that come in through the atmospheric window even when these materials are combined. A configuration is therefore adopted in the present embodiment that takes advantage of the maximum absorption at 9 to 10 µm of the SiCO newly discovered by the present applicant, whereby incident infrared rays can be efficiently absorbed by using the SiCO film in any of the above-mentioned infrared absorption films.

This SiCO film can be formed using an RF sputtering method or a plasma CVD (Chemical Vapor Deposition) method. For example, when an RF sputtering method is used, the film can easily be formed under conditions of a gas pressure of about 0.01 torr and an RF power of about 100 W by using Ar and $O_2$ gases and setting SiC as the target. When a plasma CVD method is used, the film can easily be formed under conditions of a film formation temperature of about 250° C. and a gas pressure of about 1 torr using $SiH_4$, $C_3H_8$, and $N_2O$ as starting material gases. It has been confirmed that a film is formed under these film formation conditions in which silicon, carbon, and oxygen are bonded to each other in a ratio of 1:1:1.

When a plasma CVD method is used, different types of films can be formed in sequence by changing the starting material gas. For example, after a film is formed using $SiH_4$, $NH_3$, $N_2O$, or $N_2$ as the starting material gas, an SiCO film having maximum absorption efficiency at 9 to 10 µm can be layered onto an SiON film having maximum absorption near 12 µm by changing the starting material gas to $SiH_4$, $C_3H_8$, or $N_2O$ during film formation. It was confirmed upon observing the infrared absorption characteristics of this laminate film that the absorption rate thereof is high all the way from the short-wavelength end to the long-wavelength end of the atmospheric window, as indicated by the solid line in FIG. 4. Since the infrared absorption characteristics of this laminate film approximately match the characteristics (dotted line in the diagram) obtained by superposing the infrared absorption characteristics of each film, it can be estimated what type of infrared absorption characteristics is exhibited by which laminate film by observing the infrared absorption characteristics of various types of films.

It is sufficient as long as the infrared absorption film that constitutes a photoreceptor 11 in the present invention includes an SiCO film, and the combination and layering sequence of the layered films may be arbitrarily set. For example, when there are five types of materials including SiO, SiN, SiC, SiON, and SiCN besides SiCO, the following five combinations of layered films are possible in the case of a two-layer structure: (SiCO, SiO), (SiCO, SiN), (SiCO, SiC), (SiCO, SiON), (SiCO, SiCN). The following ten combinations are possible in the case of a three-layer structure: (SiCO, SiO, SiN), (SiCO, SiO, SiC), (SiCO, SiO, SiON), (SiCO, SiO, SiCN), (SiCO, SiN, SiC), (SiCO, SiN, SiON), (SiCO, SiN, SiCN), (SiCO, SiC, SiON), (SiCO, SiC, SiCN), and (SiCO, SiON, SiCN) (the same applies in the case of a four-layer structure). It is also possible to use the same type of film in two or more layers (for example, SiN/SiCO/SiN or another combination) in the case of a laminate structure having three or more layers, and materials other than the five types of materials described above may also be used.

Although any of the combinations described above can be utilized as the infrared absorption film, a more preferred combination can also be selected with consideration for infrared absorption characteristics, heat capacity, refractive index, protective film characteristics (for example, moisture-absorption characteristics, mechanical strength, expansion coefficient, and other characteristics), interaction with as the bolometer material and other elements, process compatibility (for example, etching selectivity with other members), and manufacturability (for example, film formation temperature or type of starting material gas), and other characteristics.

For example, a two-layer laminate film may be created when priorities are the simplification of the manufacturing process and the reduction of the heat capacity of the laminate film as a whole. When priority is given to increasing the absorption efficiency of incident infrared rays, a laminate film having three or more layers may be created in which the peak wavelength of the photoreceptor 11 differs, and the absorption between peaks is as large as possible. For example, in a combination of SiCO, SiCN, and SiON, the infrared absorption characteristics become as shown in FIG. 5, and the absorption in the entire waveband from 8 to 14 µm can be further increased beyond that of the combination shown in FIG. 4.

The layering sequence is arbitrary when only the characteristics of infrared ray absorption are considered. However, since an SiCO film and an SiO film, for example, have high moisture absorption compared to other materials, it is more advantageous in terms of increasing the reliability of the thermal-type infrared detection element to use these films in a layer (the first infrared absorption film 5 or the second infrared absorption film 7 in the structure shown in FIG. 2) other than the topmost layer (outermost layer).

Absorption can be further increased when the thickness of each film that constitute a laminate film is increased, but on the other hand, the heat capacity of the photoreceptor 11 also increases, the change in temperature of the bolometer layer 6 decreases, the beam 10 is thickened, and a large amount of heat is evolved. The thickness of each film must therefore be set with consideration for the comprehensive effect of the absorption rate, the performance desired in the thermal-type infrared detection element, and other factors. Consequently, although no particular limitation is imposed on the specific thickness, the SiCO film, for example, can be made thinner than the films composed of other materials due to the large peak value of the absorption rate of the SiCO film, and has been confirmed to have adequate capability as an infrared absorption film when the thickness thereof is approximately 0.05 µm or greater.

The manufacturing method for the thermal-type infrared detection element having the abovementioned structure will next be described with reference to FIGS. 6 through 12, which show the structure of one pixel in alignment with the current path. FIGS. 6 through 12 are sectional views showing the sequence of steps in the manufacturing method for the thermal-type infrared detection element according to an embodiment of the present invention. The structure and manufacturing method described hereinafter are merely examples, and the manufacturing conditions, film thickness, and other aspects may be modified as appropriate.

Figure 6:
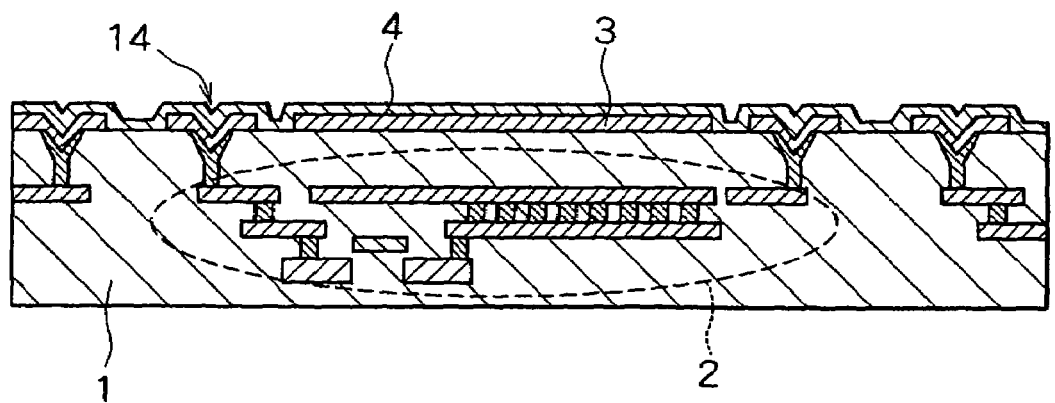
FIGS. 6 through 12 are sectional views showing the sequence of steps in the manufacturing method for the thermal-type infrared detection element according to an embodiment of the present invention.

First, as shown in FIG. 6, a CMOS circuit (reading circuit 2) or the like for reading a signal is formed inside a silicon wafer or other circuit board 1 using a publicly known method. A metal such as film composed of Al, Ti, W, or a silicide or any of these elements in the form of a film or the like is then deposited with a thickness of about 500 nm on the circuit board 1 by RF sputtering and partially etched using a resist pattern formed using a photolithography technique as a mask, and an infrared reflection film 3 for reflecting incident infrared rays to the photoreceptor 11 of each pixel is formed. A contact unit 14 is also formed for connecting the reading circuit 2 in the circuit board 1 with one end of the wiring, whose other end is connected to the bolometer layer. A silicon oxide film, silicon nitride film, silicon oxynitride film, or the like is then deposited by plasma CVD, and a protective film 4 for protecting the infrared reflection film 3 and contact unit 14 is formed.

Figure 7:
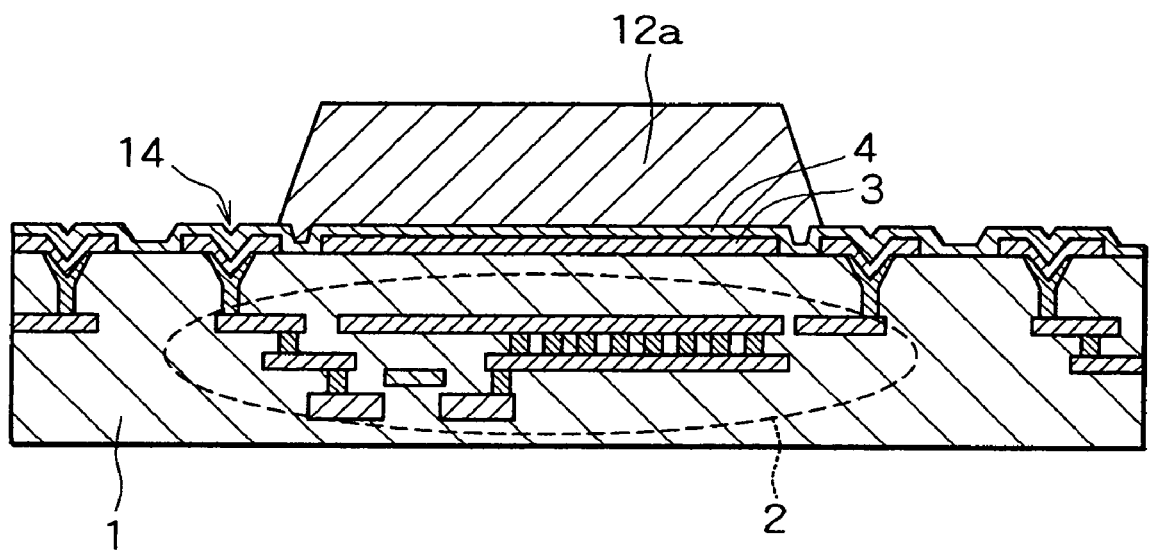

A photosensitive polyimide film or other organic film is then applied over the entire surface of the circuit board 1, and the photosensitive polyimide film is removed by exposure/development from the area other than the area in which the photoreceptor 11 is formed, as shown in FIG. 7. Densification is then performed at a temperature of about 400° C., and a sacrifice layer 12a for forming a microbridge structure is formed. The thickness of this sacrifice layer 12a is set to about 1.2 µm so that an optical resonance structure is formed by the infrared reflection film 3 and the photoreceptor 11 described hereinafter.

Figure 8:
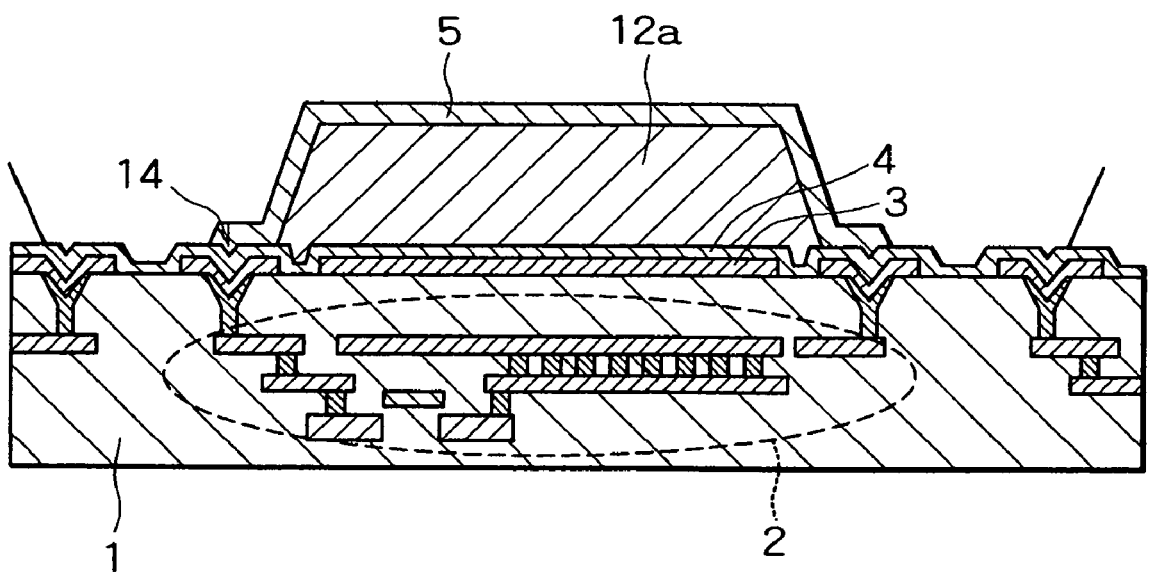

A film having a thickness of about 300 nm is then formed over the entire surface of the circuit board 1 from a material (SiON, for example) selected from the group consisting of SiCO, SiO, SiN, SiC, SiON, SiCN, and the like using RF sputtering or plasma CVD, and a first infrared absorption film 5 is formed on the top portion and side surface of the sacrifice layer 12a, as shown in FIG. 8. Any material from among the materials described above may be used to form the first infrared absorption film 5, but a material is preferably selected that is resistant to the etching of the sacrifice layer 12a described hereinafter, has adequate strength to support the bolometer layer 6 formed thereon, and has good adhesion to and no interaction with the bolometer layer 6. An SiCO, SiC, SiCN, or other carbon-containing film can be formed by either RF sputtering or plasma CVD, and an SiO, SiN, SiON, or other carbon-free film can be formed by a plasma CVD method.

Figure 9:
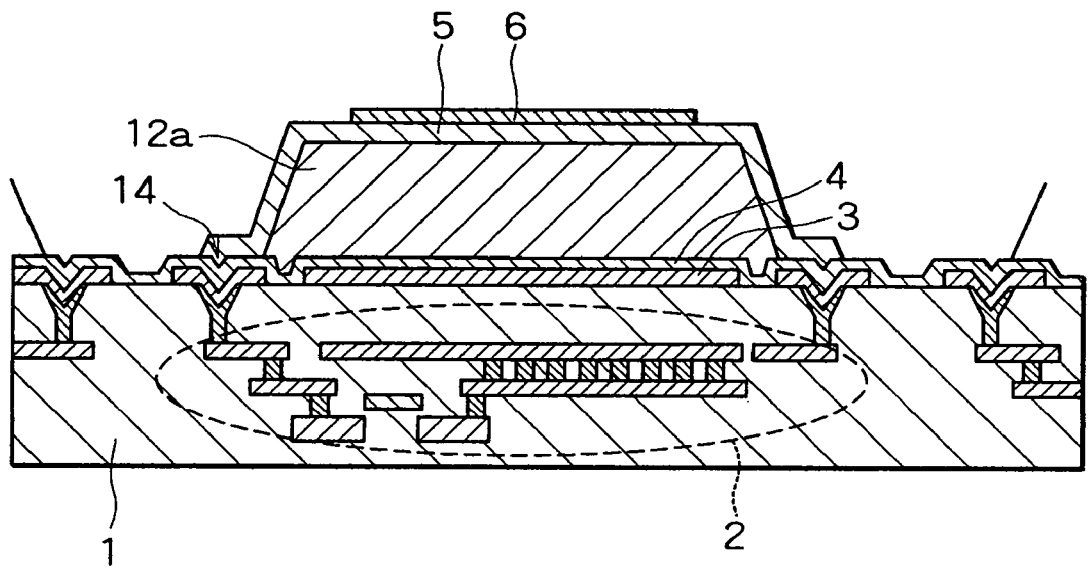

Vanadium oxide is then deposited on the first infrared absorption film 5 by reactive sputtering in an oxygen atmosphere, the vanadium oxide thin film is partially etched by plasma etching using fluorine gas with a resist pattern as the mask, and a bolometer layer 6 is formed on the first infrared absorption film 5, as shown in FIG. 9. A vanadium oxide thin film is used as the bolometer layer 6 herein, but another material having a large temperature coefficient of resistance (TCR) as described above may also be used.

Figure 10:
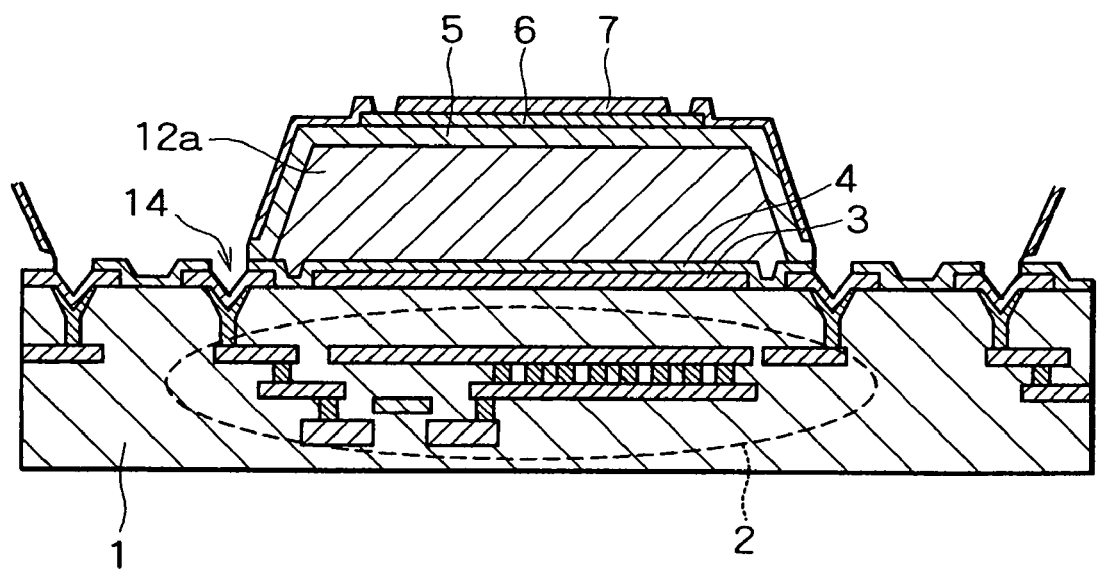

A film having a thickness of about 50 nm is then formed over the entire surface of the circuit board 1 from a material (SiCO, for example) selected from the group consisting of SiCO, SiO, SiN, SiC, SiON, SiCN, and the like by RF sputtering or plasma CVD, and a second infrared absorption film 7 for protecting the bolometer layer 6 is formed, as shown in FIG. 10. Any material from among the materials described above may be used to form the second infrared absorption film 7, but a material is preferably selected that is different from that of the first infrared absorption film 5 in order to improve the infrared absorption characteristics, and that has good adhesion to and no interaction with the bolometer layer 6. Plasma etching is then performed using carbon tetrafluoride as the etching gas and a resist pattern as the mask, the first infrared absorption film 5 and second infrared absorption film 7 on the contact unit 14 are removed, the second infrared absorption film 7 on the end portion of the bolometer layer 6 is removed, and an electrode unit 13 is formed.

Figure 11:
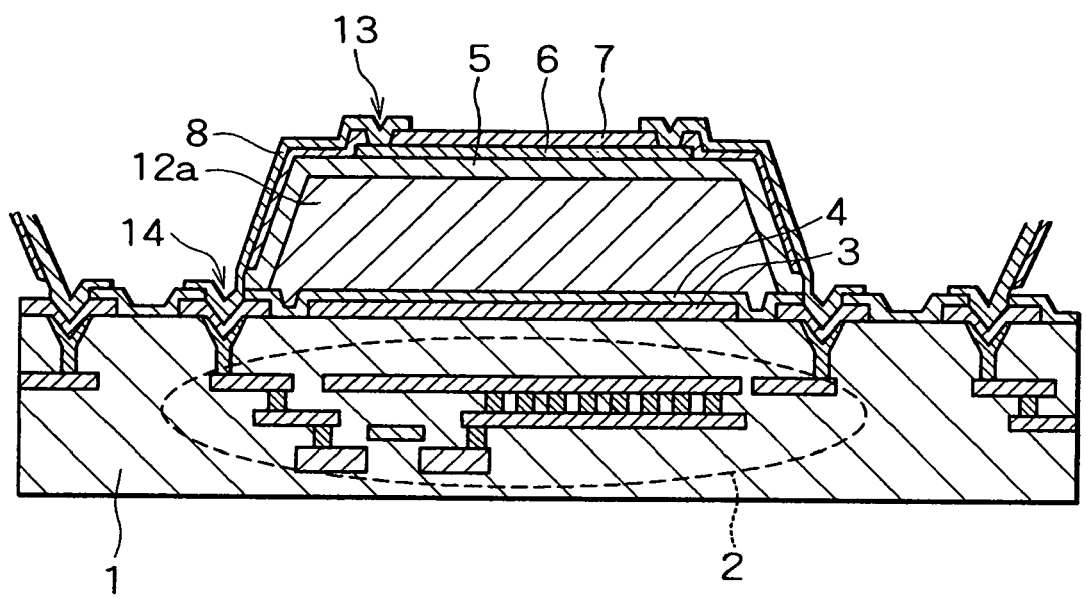

A film is then formed from Ti, Ti alloy, NiCr, or another wiring metal by RF sputtering, after which the wiring metal is partially etched by plasma etching using a gas mixture of chlorine and boron trichloride with a resist pattern as the mask, and wiring 8 is formed, as shown in FIG. 11. This wiring 8 electrically connects the electrode unit 13 of the bolometer layer 6 with the contact unit 14 of the circuit board 1, and serves as the beam 10 for holding the photoreceptor 11 in midair.

Figure 12:
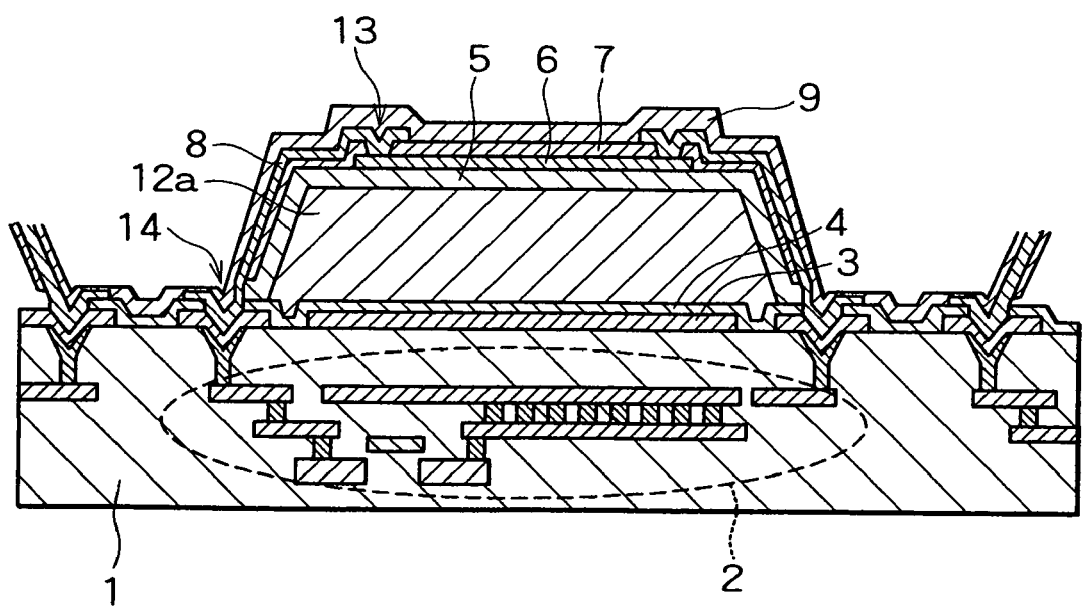

A film having a thickness of about 300 nm is then formed over the entire surface of the circuit board 1 from a material (SiCN, for example) selected from the group consisting of SiCO, SiO, SiN, SiC, SiON, SiCN, and the like by RF sputtering or plasma CVD, and a third infrared absorption film 9 for protecting the bolometer layer 6 and the wiring 8 is formed, as shown in FIG. 12. Any material from among the materials described above may be used to form the third infrared absorption film 9, but a material is preferably selected that is different from that of the first infrared absorption film 5 and second infrared absorption film 7 in order to improve the infrared absorption characteristics, and that has good environmental resistance in order to withstand being exposed on the outermost surface.

Plasma etching is then performed using carbon tetrafluoride as the etching gas and a resist pattern as the mask; a through hole (not shown in the drawing) is formed through the first infrared absorption film 5, second infrared absorption film 7, and third infrared absorption film 9; and the sacrifice layer 12a is removed using an ashing device. As shown in FIG. 2, a thermal-type infrared detection element is formed having a microbridge structure in which the photoreceptor 11 is brought into contact with the circuit board 1 only by the beam 10.

By the thermal-type infrared detection element of the present embodiment thus configured, the infrared absorption film (first infrared absorption film 5, second infrared absorption film 7, and third infrared absorption film 9) that constitutes the photoreceptor 11 is composed of a laminate film in which the SiCO film discovered by the present applicant is combined with films formed from materials selected from publicly known materials, such as SiO, SiN, SiC, SiON, SiCN, and the like. Infrared rays in the entire waveband from 8 to 14 μm can therefore be efficiently absorbed, whereby the temperature change of the bolometer layer 6 is increased, and the sensitivity of the thermal-type infrared detection element can be enhanced.

A three-layer structure including the first infrared absorption film 5, the second infrared absorption film 7, and the third infrared absorption film 9 was adopted for the infrared absorption membrane in the embodiment described above, but it is sufficient if the infrared absorption film of the present invention is a laminate film comprising the SiCO film and a film of another material. For example, a two-layer structure that includes the first infrared absorption film 5 and the second infrared absorption film 7 may be adopted. In this structure, one [of the layers] is the SiCO film, as shown in FIG. 13. A configuration may also be adopted in which another film besides the first infrared absorption film 5, second infrared absorption film 7, and third infrared absorption film 9 is added.

In the embodiment described above, the first infrared absorption film 5, the second infrared absorption film 7, and the third infrared absorption film 9 were formed so as to be contiguous with both the photoreceptor 11 and the beam 10, but there is no need for all of these infrared absorption films to be formed in the beam 10. For example, the second infrared absorption film 7 may be formed only on the photoreceptor 11, as shown in FIG. 14, and other modifications are possible. By thus appropriately setting the structure or formation area of the infrared absorption film, the infrared absorption rate of the photoreceptor 11 can be increased while preventing the heat capacity of the photoreceptor 11 from increasing, the beam 10 from evolving more heat, and the like.

A thermal-type infrared detection element having a structure in which the photoreceptor 11 is held in midair by the beam 10 was described in the embodiment above, but the present invention is in no way limited by this embodiment, and can be applied in the same manner to a thermal-type infrared detection element in which a thermal separation structure is formed by hollowing out the substrate over which the photoreceptor is layered, or to another configuration thereof. In addition to the structures shown in FIGS. 2, 13, and 14, the present invention may also be applied in the same manner to a thermal-type infrared detection element in which eaves or the like are provided to the top portion of the photoreceptor 11 in order to prevent the entry of excess infrared rays.

The structure of the present invention is not limited to the infrared absorption films that constitute a photoreceptor of a thermal-type infrared detection element, and may also be applied to a general structure for absorbing infrared rays in the waveband of 8 to 14 μm. For example, a structure that includes an SiCO film may be utilized as an infrared shielding material (for example, a film affixed to automotive glass or sunglass lenses), and may also be utilized as a band-pass filter or other filter material. Shorter-wavelength infrared rays, which could not be effectively utilized by conventional thermal-type infrared detection elements, can thereby be absorbed by the SiCO film, infrared rays throughout the abovementioned waveband can be effectively utilized, and the sensitivity of the thermal-type infrared detection element can be enhanced.

What is claimed is:

1. A thermal-type infrared detection element comprising:
 a substrate;
 a photoreceptor provided with a heat-sensitive resistor and an infrared absorption film; and
 a beam having one end fixed to said substrate, for holding said photoreceptor in midair in a state of separation from said substrate,
 wherein said infrared absorption film comprises a plurality of types of films, and said plurality of types of films includes a film composed of SiCO, and
 wherein said film composed of SiCO has a maximum absorption rate with respect to infrared rays in the waveband of approximately 9 to 10 μm.

2. The thermal-type infrared detection element according to claim 1, wherein said film composed of SiCO is formed in a layer other than the outermost layer.

3. The thermal-type infrared detection element according to claim 1, wherein some films among said plurality of types of films are formed only in said photoreceptor, and other films are formed continuously with both said photoreceptor and said beam.

4. A thermal-type infrared detection element comprising:
 a substrate;

a photoreceptor provided with a heat-sensitive resistor and an infrared absorption film; and a beam having one end fixed to said substrate, for holding said photoreceptor in midair in a state of separation from said substrate, wherein said infrared absorption film comprises a plurality of types of films, and said plurality of types of films includes a film composed of SiCO, and a film composed of at least one type of material selected from the group consisting of SiO, SiN, SiC, SiON and SiCN, and wherein said film composed of SiCO has a maximum absorption rate with respect to infrared rays in the waveband of approximately 9 to 10 μm.

5. The thermal-type infrared detection element according to claim 4, wherein said film composed of SiCO is formed in a layer other than the outermost layer.

6. The thermal-type infrared detection element according to claim 4, wherein some films among said plurality of types of films are formed only in said photoreceptor, and other films are formed continuously with both said photoreceptor and said beam.

7. A thermal-type infrared detection element comprising:

a substrate;

a photoreceptor provided with a heat-sensitive resistor and an infrared absorption film; and a beam that includes a wiring having one end connected to said heat-sensitive resistor and another end connected to a circuit formed in a substrate, for holding said photoreceptor in midair in a state of separation from said substrate, wherein said infrared absorption film comprises a plurality of types of films that include:

a first infrared absorption film formed in a bottom layer of said heat-sensitive resistor;

a second infrared absorption film formed in a top layer of said heat-sensitive resistor; and a third infrared absorption film formed in a top layer of said wiring connected to said heat-sensitive resistor via a through-hole provided to said second infrared absorption film, wherein said plurality of types of films comprising:

a film composed of SiCO material; and a film composed of any of the materials selected from the group consisting of SiO, SiN, SiC, SiON, and SiCN, and wherein said film composed of SiCO has a maximum absorption rate with respect to infrared rays in the waveband of approximately 9 to 10 μm.

8. The thermal-type infrared detection element according to claim 7, wherein said film composed of SiCO is formed in a layer other than the outermost layer.

9. The thermal-type infrared detection element according to claim 7, wherein some films among said plurality of types of films are formed only in said photoreceptor, and other films are formed continuously with both said photoreceptor and said beam.

* * * * *